(12) United States Patent
Meguriya et al.

(10) Patent No.: US 7,482,403 B2
(45) Date of Patent: Jan. 27, 2009

(54) SEALING MATERIAL FOR POLYMER ELECTROLYTE FUEL-CELL SEPARATOR

(75) Inventors: Noriyuki Meguriya, Gunma-ken (JP); Yujiro Taira, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 226 days.

(21) Appl. No.: 10/704,910

(22) Filed: Nov. 12, 2003

(65) Prior Publication Data

US 2004/0097640 A1 May 20, 2004

Related U.S. Application Data

(62) Division of application No. 10/119,148, filed on Apr. 10, 2002, now abandoned.

(30) Foreign Application Priority Data

Apr. 13, 2001 (JP) .............................. 2001-114893

(51) Int. Cl.
*C08L 83/04* (2006.01)
*H01M 2/08* (2006.01)
*H01M 2/14* (2006.01)
*H01M 2/18* (2006.01)

(52) U.S. Cl. .................. 524/588; 524/493; 524/837; 524/862; 429/32; 429/35; 429/36; 429/38; 528/15; 528/31; 528/32; 525/478

(58) Field of Classification Search .................. 524/588
See application file for complete search history.

(56) References Cited

U.S. PATENT DOCUMENTS

| | | | |
|---|---|---|---|
| 4,585,830 A * | 4/1986 | Sweet | .................. 524/862 |
| 5,013,772 A * | 5/1991 | Fujiki et al. | .................. 523/213 |
| 5,164,461 A | 11/1992 | Mitchell et al. | |
| 5,216,104 A | 6/1993 | Okami et al. | |
| 5,336,570 A * | 8/1994 | Dodge, Jr. | .................. 429/31 |
| 5,380,770 A | 1/1995 | Doin et al. | |
| 5,519,082 A | 5/1996 | Yoshino | |
| 5,661,222 A | 8/1997 | Hare | |
| 5,679,727 A * | 10/1997 | Griffith et al. | .................. 523/213 |
| 5,756,598 A | 5/1998 | Chung et al. | |
| 5,994,461 A | 11/1999 | Nakamura et al. | |
| 6,153,326 A | 11/2000 | Matsukawa et al. | |
| 6,372,373 B1 * | 4/2002 | Gyoten et al. | .................. 429/35 |
| 6,824,874 B1 * | 11/2004 | Shah et al. | .................. 428/413 |

FOREIGN PATENT DOCUMENTS

| | | |
|---|---|---|
| EP | 0552919 A | 7/1993 |
| EP | 0577357 A | 1/1994 |
| JP | 2000-920 | 1/2000 |
| JP | 2000-33630 | 2/2000 |
| JP | 2000-48832 | 2/2000 |
| JP | 2000-62086 | 2/2000 |
| JP | 2000-77084 | 3/2000 |
| JP | 2000-133290 | 5/2000 |
| JP | 2000-156215 | 6/2000 |
| JP | 2000-176962 | 6/2000 |
| JP | 2000-188118 | 7/2000 |
| JP | 2000-231927 | 8/2000 |
| JP | 2001-199002 | 7/2001 |
| JP | 2001-216979 | 8/2001 |

\* cited by examiner

*Primary Examiner*—Randy Gulakowski
*Assistant Examiner*—John J Figueroa
(74) *Attorney, Agent, or Firm*—Birch, Stewart, Kolasch & Birch, LLP

(57) ABSTRACT

A sealing material comprising (A) an organopoly-siloxane containing at least two alkenyl groups in a molecule, (B) a resinous copolymer composed mainly of $R_3SiO_{1/2}$ and $SiO_2$ units in a molar ratio of 0.5-1.5:1, wherein R is a monovalent hydrocarbon group, and containing $5 \times 10^{-3}$ to $1 \times 10^{-4}$ mol/g of vinyl groups, (C) an organohydrogenpolysiloxane containing at least two Si—H groups in a molecule, (D) fumed silica having a specific surface area of 150-400 $m^2/g$, and (E) an addition reaction catalyst is suited for sealing one side edge of a polymer electrolyte fuel-cell separator since it has excellent acid resistance and improved compression set in acidic solutions, and exerts satisfactory seal effects.

8 Claims, No Drawings

US 7,482,403 B2

SEALING MATERIAL FOR POLYMER ELECTROLYTE FUEL-CELL SEPARATOR

This application is a divisional of application Ser. No. 10/119,148, filed on Apr. 10, 2002, now abandoned, the entire contents of which are hereby incorporated by reference and for which priority is claimed under 35 U.S.C. § 120; and this application claims priority of Application No. 2001-114893 filed in Japan on Apr. 13, 2001 under 35 U.S.C. § 119.

This invention relates to a sealing material for use with separators in polymer electrolyte fuel cells which are typical small size fuel cells, the sealing material having the advantages of easy molding and long-term service.

BACKGROUND OF THE INVENTION

Fuel cells have the great advantages that there is in a substantial sense no need for the fossil fuel which requires to pay attention to the depletion of resource, no or little noise is produced upon power generation, and the recovery of energy is high as compared with other energy power generation devices. The construction of fuel cells as relatively small size power generation plants installed in buildings and factories has been under development and some are used in practice. In particular, polymer electrolyte fuel cells operate at low temperature as compared with other types of fuel cell. They eliminate in a material aspect a concern about the corrosion of cell constituent parts and can discharge a relatively high current flow for low-temperature operation. They are thus of great interest not only as household cogeneration devices, but also as substitute power supplies for internal combustion engines on vehicles. The polymer electrolyte fuel cells are constructed of several components including a separator which is generally in the form of a plate having a plurality of parallel channels in one or both surfaces thereof. The separator plays the roles of conducting to the exterior the electricity generated on the gas diffusing electrode within the fuel cell, discharging the water formed in the channels during the electricity generation process and maintaining the channels as a flowpath for reactant gas to flow into the fuel cell. The fuel-cell separators are required to be reduced in size. Additionally, since a plurality of separators are used in stack, there is a need for a separator sealing material which remains fully durable in long-term service.

As the separator sealing material, packing materials based on various resins have been under study in the art. Sealing materials based on silicone rubber are often employed for their moldability, heat resistance and elasticity. Of the silicone rubbers, cured rubbers of addition curing type silicone rubber compositions have been used because of their ease of molding, but are still unsatisfactory in maintaining elasticity over a long term. In particular, such cured rubbers are difficult to satisfy both acid resistance and seal performance in acidic aqueous solution which are requisite as the packing material for fuel-cell separators.

SUMMARY OF THE INVENTION

An object of the invention is to provide a sealing material for use with polymer electrolyte fuel-cell separators, which has improved acid resistance and reduced compression set in acidic solutions, and maintains an effective seal.

The invention provides a sealing material for sealing at least one side edge of a polymer electrolyte fuel-cell separator, comprising in parts by weight as essential components:

(A) 100 parts of an organopolysiloxane containing at least two alkenyl groups each attached to a silicon atom in a molecule, (B) 5 to 50 parts of a resinous copolymer composed mainly of $R_3SiO_{1/2}$ units and $SiO_2$ units in a molar ratio of 0.5:1 to 1.5:1, wherein R is a substituted or unsubstituted monovalent hydrocarbon group, and containing $5\times10^{-3}$ to $1\times10^{-4}$ mol/g of vinyl groups, (C) 0.5 to 20 parts, per 100 parts of components (A) and (B) combined, of an organohydrogenpolysiloxane containing at least two hydrogen atoms each attached to a silicon atom in a molecule, (D) 10 to 30 parts, per 100 parts of components (A) and (B) combined, of fumed silica having a specific surface area of 150 to 400 m²/g, and (E) a catalytic amount of an addition reaction catalyst.

The sealing material obtained by combining specific amounts of components (A) to (E) is suited for use with polymer electrolyte fuel-cell separators, has improved acid resistance and reduced compression set in acidic solutions, and forms a seal structure having improved seal effects.

DESCRIPTION OF THE PREFERRED EMBODIMENTS

Component (A) used in the sealing material according to the invention is an organopolysiloxane containing on the average at least two alkenyl groups in a molecule. Most often, it is represented by the following average compositional formula (1).

$$R^1_a SiO_{(4-a)/2} \tag{1}$$

In formula (1), each $R^1$ is independently a substituted or unsubstituted monovalent hydrocarbon group having 1 to 10 carbon atoms, preferably 1 to 8 carbon atoms, and "a" is a positive number in the range of 1.5 to 2.8, preferably 1.8 to 2.5.

Examples of the silicon atom-bonded substituted or unsubstituted monovalent hydrocarbon group represented by $R^1$ include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, as well as substituted groups in which some or all of the hydrogen atoms on the foregoing are replaced by halogen atoms (e.g., fluoro, bromo and chloro), cyano groups or the like, such as chloromethyl, chloropropyl, bromoethyl, trifluoropropyl and cyanoethyl. Preferably, at least 90 mol %, especially at least 95 mol % of the entire $R^1$ groups are methyl. More preferably, 95 to 100 mol %, especially 98 to 100 mol % of the $R^1$ groups excluding alkenyl are methyl. At least two of the $R^1$ groups should be alkenyl groups, preferably of $C_{2-8}$, more preferably of $C_{2-6}$, and most preferably vinyl. The content of alkenyl groups is preferably $5.0\times10^{-6}$ mol/g to $5.0\times10^{-3}$ mol/g, more preferably $1.0\times10^{-5}$ mol/g to $1.0\times10^{-3}$ mol/g of the organopolysiloxane. An alkenyl content of less than $5.0\times10^{-6}$ mol/g may give too low a rubber strength to provide a satisfactory seal whereas an alkenyl content of more than $5.0\times10^{-3}$ mol/g may result in a higher crosslinked density and hence, brittle rubber. The alkenyl groups may be attached to a silicon atom at the end of the molecular chain or a silicon atom midway the molecular chain or both.

The organopolysiloxane basically has a straight chain structure, but may partially have a branched or cyclic structure. The molecular weight is not critical and the useful siloxane may range from a liquid one having a low viscosity to a gum-like one having a high viscosity. To obtain a liquid material which is readily applicable to separators, the organopolysiloxane should preferably have an average degree of polymerization of 100 to 2,000, preferably 150 to 1,500. An average degree of polymerization of less than 100 may fail to provide satisfactory rubber elasticity as the seal whereas an average degree above 2,000 may lead to a high viscosity and difficult application to separators.

Component (B) is a resinous copolymer composed mainly of $R_3SiO_{1/2}$ units and $SiO_2$ units. R is selected from substituted or unsubstituted monovalent hydrocarbon groups, preferably having 1 to 10 carbon atoms, more preferably 1 to 8 carbon atoms. Examples of the substituted or unsubstituted monovalent hydrocarbon group represented by R include alkyl groups such as methyl, ethyl, propyl, isopropyl, butyl, isobutyl, tert-butyl, pentyl, neopentyl, hexyl, cyclohexyl, octyl, nonyl, and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl, as well as substituted groups in which some or all of the hydrogen atoms on the foregoing are replaced by halogen atoms (e.g., fluoro, bromo and chloro), cyano groups or the like, such as chloromethyl, chloropropyl, bromoethyl, trifluoropropyl and cyanoethyl.

The resinous copolymer may consist of $R_3SiO_{1/2}$ units and $SiO_2$ units or if desired, additionally contain $R_2SiO_{2/2}$ units and $RSiO_{3/2}$ units (wherein R is as defined above) in a total amount of up to 50 mol %, preferably up to 40 mol %, based on the entire copolymer. The molar ratio of $R_3SiO_{1/2}$ units to $SiO_2$ units, $[R_3SiO_{1/2}/SiO_2]$ should be from 0.5:1 to 1.5:1, preferably from 0.5:1 to 1.3:1. A molar ratio of less than 0.5 lowers acid resistance whereas a molar ratio of more than 1.5 increases compression set and compromises the compatibility between components (A) and (C) to impede blending.

The resinous copolymer (B) should contain $5 \times 10^{-3}$ to $1 \times 10^{-4}$ mol/g, especially $3 \times 10^{-3}$ to $2 \times 10^{-4}$ mol/g of vinyl groups. A vinyl content of more than $5 \times 10^{-3}$ mol/g results in a hard brittle rubber which achieves an insufficient seal whereas a vinyl content of less than $1 \times 10^{-4}$ mol/g leads to poor acid resistance.

The resinous copolymer can generally be prepared by hydrolyzing a suitable chlorosilane and alkoxysilane in a well-known manner.

The amount of the resinous copolymer (B) blended is 5 to 50 parts, preferably 10 to 40 parts by weight per 100 parts by weight of component (A). Less than 5 parts of the resinous copolymer fails to provide satisfactory acid resistance whereas more than 50 parts increases compression set.

Component (C) is an organohydrogenpolysiloxane containing at least two, preferably at least three hydrogen atoms each attached to a silicon atom (i.e., SiH groups) in a molecule, Component (C) serves as a curing agent for curing the composition through hydrosilylation addition reaction wherein SiH groups in the molecule crosslink with silicon atom-bonded alkenyl groups in components (A) and (B). Most often, the organohydrogenpolysiloxane (C) is represented by the following average compositional formula (2).

$$R^2{}_bH_cSiO_{(4-b-c)/2} \quad (2)$$

In formula (2), $R^2$ is a substituted or unsubstituted monovalent hydrocarbon group having 1 to 10 carbon atoms, "b" is a positive number of 0.7 to 2.1, "c" is a positive number of 0.001 to 1.0, and b+c is from 0.8 to 3.0. Preferred are those having at least two, more preferably 3 to 100, most preferably 3 to 50 silicon atom-bonded hydrogen atoms in a molecule.

Examples of the monovalent hydrocarbon group represented by $R^2$ are as exemplified above for $R^1$ although groups free of aliphatic unsaturation are preferred. Preferably, "b" is 0.8 to 2.0, "c" is 0.01 to 1.0, and b+c is from 1.0 to 2.5. The molecular structure of the organo-hydrogenpolysiloxane may be straight, branched, cyclic or three-dimensional network. The number of silicon atoms in one molecule, that is the degree of polymerization, is preferably about 2 to about 300, especially about 4 to about 150. Differently stated, organohydrogenpolysiloxanes which are liquid at room temperature (25° C.) are preferred. The silicon atom-bonded hydrogen atom (SiH group) may be positioned at the end or an intermediate of the molecular chain or both.

Exemplary of the organohydrogenpolysiloxane (C) are 1,1,3,3-tetramethyldisiloxane, methylhydrogencyclopoly-siloxane, methylhydrogensiloxane-dimethylsiloxane cyclic copolymers, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane copolymers, both end trimethylsiloxy-blocked methylhydrogensiloxane-diphenylsiloxane-dimethylsiloxane copolymers, both end dimethylhydrogensiloxy-blocked methylhydrogensiloxane-dimethylsiloxane-diphenylsiloxane copolymers, copolymers composed of $(CH_3)_2HSiO_{1/2}$ units, $(CH_3)_3SiO_{1/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units.

The amount of the organohydrogenpolysiloxane (C) blended is 0.5 to 20 parts, especially 0.6 to 15 parts by weight, per 100 parts by weight of components (A) and (B) combined. The molar ratio of silicon atom-bonded hydrogen atoms (Si—H groups) in organohydrogenpolysiloxane (C) to the total of silicon atom-bonded alkenyl groups in components (A) and (B), [Si—H/alkenyl] is preferably from 0.8:1 to 5.0:1, especially from 1.0:1 to 3.0:1. A molar ratio outside this range is likely to increase compression set, aggravating the seal effect.

Component (D) is fumed silica which is essential to impart satisfactory strength to silicone rubber. The fumed silica should have a specific surface area of 150 to 400 m²/g, preferably 150 to 350 m²/g, as measured by the BET method. A surface area below 150 m²/g may compromise acid resistance whereas above 400 m²/g, compression set increases. The fumed silica may be used as such, but preferably after treatment with a surface hydrophobizing agent. Alternatively, a surface treating agent is added when the fumed silica is mixed with the silicone fluid, whereby the fumed silica is treated during the mixing step. Suitable surface treating agents are well-known agents including alkylalkoxysilanes, alkylchlorosilanes, alkylsilazanes, silane coupling agents, titanate treating agents, and fatty acid esters alone or in admixture. When two or more agents are used, they may be applied at the same time or different times.

The amount of the fumed silica (D) blended is 10 to 30 parts, especially 12 to 28 parts by weight, per 100 parts by weight of components (A) and (B) combined. Less than 10 parts of the fumed silica fails to provide satisfactory rubber strength whereas more than 40 parts increases compression set, aggravating the seal effect.

Component (E) is an addition reaction catalyst which is, most often, selected from platinum catalysts such as platinum black, platinic chloride, chloroplatinic acid, reaction products of chloroplatinic acid with monohydric alcohols, complexes of chloroplatinic acid with olefins, platinum bisacetoacetate as well as palladium catalysts and rhodium catalysts. The amount of the addition reaction catalyst blended is a catalytic amount and usually about 0.5 to 1,000 ppm, especially about 1 to 500 ppm of platinum group metal based on the weight of components (A) and (B) combined.

If necessary, the composition may further contain other components, for example, fillers such as precipitated silica, ground quartz, diatomaceous earth and calcium carbonate; electrically conductive agents such as carbon black, conductive zinc white and metal powder; hydrosilylation reaction regulating agents such as nitrogenous compounds, acetylene compounds, phosphorus compounds, nitrile compounds, carboxylates, tin compounds, mercury compounds, and sulfur compounds; heat resistance improvers such as iron oxide and cerium oxide; internal parting agents such as dimethylsilicone fluid; tackifiers, and thixotropic agents.

The sealing material of the invention is an addition reaction curing type silicone rubber composition comprising the above-described components. It is obtained by mixing and milling the components by any technique known in the silicone rubber art. The sealing material thus obtained is applicable as sealant to polymer electrolyte fuel-cell separators, using any well-known technique. More particularly, when fuel-cell separators are manufactured using the inventive sealing material, the sealing material is molded into a seal shape by a compression molding, casting or injection molding technique, and the molded seal is combined with a separator. Alternatively, integrated seal-separator members are manufactured by dipping, coating, screen printing, or insert molding. Preferred curing conditions include a temperature of 100 to 300° C. and a time of 10 seconds to 30 minutes. The separator used herein is preferably obtained by integral molding of a conductive powder such as metal or carbon in a binder such as an epoxy resin or phenolic resin.

EXAMPLE

Examples of the invention are given below by way of illustration and not by way of limitation. All parts are by weight.

Example 1

Dimethylpolysiloxane (1) blocked with a dimethylvinylsiloxy group at each end and having an average degree of polymerization of 500, 48 parts, was mixed with 20 parts of a resinous copolymer consisting of $(CH_3)_3SiO_{1/2}$, $(CH_2=CH)(CH_3)_2SiO_{1/2}$ and $SiO_2$ units wherein the molar ratio of the sum of $(CH_3)_3SiO_{1/2}$ and $(CH_2=CH)(CH_3)_2SiO_{1/2}$ units to $SiO_2$ units is 0.8 and the vinyl content is 0.0005 mol/g, 32 parts of fumed silica having a specific surface area of 200 m$^2$/g (Aerosil 200 by Nippon Aerosil Co., Ltd.), 5 parts of hexamethyldisilazane, and 2.0 parts of water at room temperature for 30 minutes. The mixture was heated at 150° C., agitated at the temperature for 3 hours, and then cooled, yielding a silicone rubber base. To 100 parts of the silicone rubber base was added 80 parts of dimethylpoly-siloxane (2) blocked with a dimethylvinylsiloxy group at each end and having an average degree of polymerization of 220. Agitation was continued for 30 minutes, after which were added 5.6 parts (giving [Si—H/alkenyl]=1.5) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%), press cured at 120° C. for 10 minutes, and post cured in an oven at 200° C. for 4 hours. The cured sample was measured for hardness and compression set according to JIS K6249 and examined for acid resistance. The results are shown in Table 1. The compression set was measured under two sets of conditions: 120° C.×500 hours in air and 120° C.×500 hours in 0.01N sulfuric acid solution. The acid resistance was examined by immersing a specimen of 3 mm×3 mm×1 mm thick in a 10% sulfuric acid solution at 100° C. for 500 hours and then visually observing an outer appearance change and measuring a weight loss.

Example 2

Dimethylpolysiloxane (1) in Example 1, 68 parts, was mixed with 50 parts of a resinous copolymer consisting of $(CH_3)_3SiO_{1/2}$, $(CH_2=CH)(CH_3)_2SiO_{1/2}$, $SiO_2$ and $(CH_3)_2SiO$ units wherein the molar ratio of the sum of $(CH_3)_3SiO_{1/2}$ and $(CH_2=CH)(CH_3)_2SiO_{1/2}$ units to $SiO_2$ units is 1.0, the $(CH_3)_2SiO$ unit content is 20 wt %, and the vinyl content is 0.0002 mol/g, 22 parts of fumed silica having a specific surface area of 300 m$^2$/g (Aerosil 300 by Nippon Aerosil Co., Ltd.), 3 parts of hexamethyldisilazane, and 2.0 parts of water at room temperature for 30 minutes. The mixture was heated at 150° C., agitated at the temperature for 3 hours, and then cooled, yielding a silicone rubber base. To 140 parts of the silicone rubber base was added 50 parts of dimethylpolysiloxane (2) in Example 1. Agitation was continued for 30 minutes, after which were added 6.6 parts (giving [Si—H/alkenyl]=2.0) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

Example 3

Dimethylpolysiloxane (1) in Example 1, 68 parts, was mixed with 40 parts of the resinous copolymer consisting of $(CH_3)_3SiO_{1/2}$, $(CH_2=CH)(CH_3)_2SiO_{1/2}$ and $SiO_2$ units in Example 1, 22 parts of fumed silica having a specific surface area of 250 m$^2$/g which had been surface treated with dimethyldi-chlorosilane (Aerosil R976 by Nippon Aerosil Co., Ltd.), 5 parts of hexamethyldisilazane, and 2.0 parts of water at room temperature for 30 minutes. The mixture was heated at 150° C., agitated at the temperature for 3 hours, and then cooled, yielding a silicone rubber base. To 130 parts of the silicone rubber base was added 20 parts of dimethylpolysiloxane (2) in Example 1. Agitation was continued for 30 minutes, after which were added 5.2 parts (giving [Si—H/alkenyl]=1.2) of methylhydrogenpolysiloxane (4) having Si—H groups at both ends and on side chains wherein the degree of polymerization is 12 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

Comparative Example 1

Dimethylpolysiloxane (1) in Example 1, 68 parts, was mixed with 32 parts of fumed silica (Aerosil 200) in Example 1, 5 parts of hexamethyldisilazane, and 2.0 parts of water at room temperature for 30 minutes. The mixture was heated at 150° C., agitated at the temperature for 3 hours, and then cooled, yielding a silicone rubber base. To 100 parts of the silicone rubber base was added 80 parts of dimethylpolysiloxane (2) in Example 1. Agitation was continued for 30 minutes, after which were added 2.5 parts (giving [Si—H/alkenyl]=1.5) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

Comparative Example 2

Dimethylpolysiloxane (1) in Example 1, 55 parts, was mixed with 20 parts of the resinous copolymer consisting of $(CH_3)_3SiO_{1/2}$, $(CH_2=CH)(CH_3)2SiO_{1/2}$ and $SiO_2$ units in Example 1, 35 parts of fumed silica (Aerosil 300) in Example 2, 5 parts of hexamethyldisilazane, and 2.0 parts of water at room temperature for 30 minutes. The mixture was heated at 150° C., agitated at the temperature for 3 hours, and then cooled, yielding a silicone rubber base. To 110 parts of the silicone rubber base was added 30 parts of dimethylpolysiloxane (2) in Example 1. Agitation was continued for 30 minutes, after which were added 5.6 parts (giving [Si—H/alkenyl]=2.0) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

Comparative Example 3

Dimethylpolysiloxane (1) in Example 1, 68 parts, was mixed with 20 parts of the resinous copolymer consisting of $(CH_3)_3SiO_{1/2}$, $(CH_2=CH)(CH_3)_2SiO_{1/2}$, $SiO_2$ and $(CH_3)_2SiO$ units in Example 2, 32 parts of fumed silica having a specific surface area of 130 m$^2$/g (Aerosil R972 by Nippon Aerosil Co., Ltd.), 5 parts of hexamethyldisilazane, and 2.0 parts of water at room temperature for 30 minutes. The mixture was heated at 150° C., agitated at the temperature for 3 hours, and then cooled, yielding a silicone rubber base. To 120 parts of the silicone rubber base was added 80 parts of dimethylpolysiloxane (2) in Example 1. Agitation was continued for 30 minutes, after which were added 3.5 parts (giving [Si—H/alkenyl]=1.2) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

Comparative Example 4

Dimethylpolysiloxane (1) in Example 1, 68 parts, was mixed with 40 parts of a resinous copolymer consisting of $(CH_3)_3SiO_{1/2}$, $(CH_2=CH)(CH_3)_2SiO_{1/2}$, $SiO_2$ and $(CH_3)_2SiO$ units wherein the molar ratio of the sum of $(CH_3)_3SiO_{1/2}$ and $(CH_2=CH)(CH_3)_2SiO_{1/2}$ units to $SiO_2$ units is 0.7, the $(CH_3)_2SiO$ unit content is 40 wt %, and the vinyl content is 0.00005 mol/g, 32 parts of fumed silica having a specific surface area of 170 m$^2$/g (Aerosil R974 by Nippon Aerosil Co., Ltd.), 5 parts of hexamethyldisilazane, and 2.0 parts of water at room temperature for 30 minutes. The mixture was heated at 150° C., agitated at the temperature for 3 hours, and then cooled, yielding a silicone rubber base. To 140 parts of the silicone rubber base was added 30 parts of dimethylpolysiloxane (2) in Example 1. Agitation was continued for 30 minutes, after which were added 3.14 parts (giving [Si—H/alkenyl]=2.0) of methylhydrogenpolysiloxane (3) having Si—H groups at both ends and on side chains wherein the degree of polymerization is 17 and the Si—H content is 0.0060 mol/g as the crosslinking agent and 0.05 part of ethynyl cyclohexanol as the reaction regulating agent. Subsequent agitation for 15 minutes yielded a silicone rubber composition. This silicone rubber composition was mixed with 0.1 part of a platinum catalyst (Pt concentration 1%) and cured as in Example 1. The cured sample was determined for hardness, compression set and acid resistance as in Example 1. The results are shown in Table 1.

TABLE 1

| | | Example | | | Comparative Example | | | |
|---|---|---|---|---|---|---|---|---|
| | | 1 | 2 | 3 | 1 | 2 | 3 | 4 |
| Hardness | | 52 | 58 | 61 | 42 | 60 | 48 | 46 |
| Compression set (%) | in air | 12.8 | 10.5 | 13.1 | 14.3 | 18.8 | 10.6 | 16.6 |
| | in 0.01 N sulfuric acid | 32.2 | 25.8 | 31.2 | 30.6 | 58.3 | 22.9 | 41.2 |
| Acid | Appearance | no | no | no | surface | no | surface | surface |

TABLE 1-continued

|  |  | Example | | | Comparative Example | | | |
|---|---|---|---|---|---|---|---|---|
|  |  | 1 | 2 | 3 | 1 | 2 | 3 | 4 |
| resistance | change | change | change | change | crazing | change | crazing | crazing |
|  | Weight change (%) | −2.8 | −1.9 | −2.2 | −28.5 | −1.8 | −15.3 | −18.9 |

There has been described a sealing material which has excellent acid resistance and improved compression set in acidic solutions, and exerts satisfactory seal effects for use with polymer electrolyte fuel-cell separators.

Japanese Patent Application No. 2001-114893 is incorporated herein by reference.

Reasonable modifications and variations are possible from the foregoing disclosure without departing from either the spirit or scope of the present invention as defined by the claims.

The invention claimed is:

1. A fuel-cell, including a plurality of polymer electrolyte fuel-cell separators used in a stack, at least one side edge of each separator being sealed with a cured product of a sealing material comprising in parts by weight as essential components:
    (A) 100 parts of an organopolysiloxane containing at least two alkenyl groups each attached to a silicon atom in a molecule,
    (B) 5 to 50 parts of a resinous copolymer consisting of
        $(R)_3SiO_{1/2}$ units and $SiO_2$ units, or of
        $(R)_3SiO_{1/2}$ units and $SiO_2$ units and $(R)_2SiO_{2/2}$ units, or of
        $(R)_3SiO_{1/2}$ units and $SiO_2$ units and $RSiO_{3/2}$ units, or of
        $(R)_3SiO_{1/2}$ units and $SiO_2$ units and $(R)_2SiO_{2/2}$ units and $RSiO_{3/2}$ units,
        in a molar ratio of $(R)_3SiO_{1/2}$ units to $SiO_2$ units $[(R)_3SiO_{1/2}/SiO_2]$ of 0.5:1 to 1.5:1, $(R)_2SiO_{2/2}$ units and $RSiO_{3/2}$ units being contained in a total amount of up to 50 mol % based on the entire molecule, wherein R is a substituted or unsubstituted monovalent hydrocarbon group, and containing $5 \times 10^{-3}$ to $1 \times 10^{-4}$ mol/g of vinyl groups,
    (C) 0.5 to 20 parts, per 100 parts of components (A) and (B) combined, of an organohydrogenpolysiloxane containing at least two hydrogen atoms each attached to a silicon atom in a molecule,
    (D) 10 to 30 parts, per 100 parts of components (A) and (B) combined, of fumed silica having a specific surface area of 150 to 400 m²/g, and
    (E) a catalytic amount of an addition reaction catalyst,
    wherein said cured product has a compression set of 32.2% or less measured under the conditions of 120° C.×500 hours in 0.01 N sulfuric acid solution and has improved acid resistance as indicated by a weight loss of 2.8% or less measured by immersing a specimen having the dimensions 3 mm×3 mm×1 mm in a 10% sulfuric acid solution at 100° C. for 500 hours.

2. The fuel cell of claim 1, wherein the molar ratio of Si—H groups in organohydrogenpolysiloxane (C) to the total of silicon atom bonded alkenyl groups in the organopolysiloxane (A) and resinous copolymer (B) is 0.8:1 to 5.0:1.

3. The fuel cell of claim 1, wherein the organopolysiloxane (A) has an average degree of polymerization of 100 to 2,000 and at least 90% of the entire organic groups attached to silicon atoms therein are methyl.

4. The fuel cell of claim 1, wherein the organopolysiloxane (A) is that of formula (1)

$$(R^1)_a SiO_{(4-a)/2} \tag{1}$$

wherein each $R^1$ is independently selected from the group consisting of substituted or unsubstituted hydrocarbon groups having 1 to 10 carbon atoms; and
"a" is a positive number from about 1.5 to about 2.8.

5. The fuel cell of claim 4, wherein $R^1$ is a member selected from the group consisting of methyl, ethyl and propyl.

6. The fuel cell of claim 1, wherein R is a member selected from the group consisting of methyl, ethyl and propyl.

7. The fuel cell of claim 1, wherein the resinous copolymer (B) contains $3 \times 10^{-3}$ to $2 \times 10^{-4}$ mol/g of vinyl groups.

8. The fuel cell of claim 1, wherein the cured product has a compression set of 25.8% to 32.2%.

* * * * *